United States Patent
Zeng et al.

(10) Patent No.: US 10,007,372 B2
(45) Date of Patent: Jun. 26, 2018

(54) TOUCH PANEL AND TOUCH DISPLAY DEVICE

(71) Applicants: BOE Technology Group Co., Ltd., Beijing (CN); HEFEI Xinsheng Optoelectronics Technology Co., Ltd., Hefei (CN)

(72) Inventors: Ting Zeng, Beijing (CN); Ming Hu, Beijing (CN); Taofeng Xie, Beijing (CN); Zhongzheng Yang, Beijing (CN); Xianlin Ding, Beijing (CN); Xiaofei Zhu, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 86 days.

(21) Appl. No.: 15/127,100

(22) PCT Filed: Sep. 30, 2015

(86) PCT No.: PCT/CN2015/091165
§ 371 (c)(1),
(2) Date: Sep. 19, 2016

(87) PCT Pub. No.: WO2016/197490
PCT Pub. Date: Dec. 15, 2016

(65) Prior Publication Data
US 2018/0032185 A1    Feb. 1, 2018

(30) Foreign Application Priority Data

Jun. 10, 2015   (CN) .......................... 2015 1 0319716

(51) Int. Cl.
*G06F 3/041* (2006.01)
*G02F 1/1333* (2006.01)
(Continued)

(52) U.S. Cl.
CPC .......... *G06F 3/0412* (2013.01); *G02F 1/1343* (2013.01); *G02F 1/13338* (2013.01); *G06F 3/044* (2013.01); *H02J 7/35* (2013.01)

(58) Field of Classification Search
CPC .... G02F 1/13338; G06F 3/0412; G06F 3/044; G06F 3/041; F21S 9/037; H02S 40/38; G09F 27/007; Y02E 10/50
See application file for complete search history.

(56) References Cited

U.S. PATENT DOCUMENTS

| | | | | |
|---|---|---|---|---|
| 2010/0078230 A1* | 4/2010 | Rosenblatt | .............. | G06F 3/041 |
| | | | | 178/18.01 |
| 2011/0157034 A1* | 6/2011 | Chen | .................... | H04M 1/0266 |
| | | | | 345/173 |

(Continued)

FOREIGN PATENT DOCUMENTS

| | | |
|---|---|---|
| CN | 101877734 A | 11/2010 |
| CN | 102290477 A | 12/2011 |

(Continued)

OTHER PUBLICATIONS

Mar. 7, 2016—(WO) International Search Report and Written Opinion Appn PCT/CN2015/091165 with English Tran.

(Continued)

*Primary Examiner* — Koosha Sharifi-Tafreshi
(74) *Attorney, Agent, or Firm* — Banner & Witcoff, Ltd.

(57) ABSTRACT

A touch panel and a touch display device are disclosed. The touch panel includes a base substrate and a touch electrode layer and a transparent thin film photovoltaic cell disposed on the base substrate. The touch electrode layer and the transparent thin film photovoltaic cell are superimposed to each other and disposed on the same side of the base substrate, and a transparent insulating layer is disposed between the touch electrode layer and the transparent thin film photovoltaic cell; or the touch electrode layer and the transparent thin film photovoltaic cell are respectively disposed on either side of the base substrate; and the transparent thin film photovoltaic cell includes an n-doped graphene layer and a p-doped graphene layer. The transparent thin film (Continued)

photovoltaic cell disposed in the touch panel can charge an electronic product so that the service time of the touch panel can be prolonged.

17 Claims, 8 Drawing Sheets

(51) Int. Cl.
*G06F 3/044* (2006.01)
*H02J 7/35* (2006.01)
*G02F 1/1343* (2006.01)

(56) References Cited

U.S. PATENT DOCUMENTS

2012/0141799 A1* 6/2012 Kub .................. B82Y 30/00
428/408

2012/0247545 A1* 10/2012 Aria .................. B82Y 30/00
136/255
2014/0017444 A1 1/2014 Shimizu et al.
2014/0125603 A1* 5/2014 Lin ................ H01L 31/02168
345/173

FOREIGN PATENT DOCUMENTS

| | | |
|---|---|---|
| CN | 103246098 A | 8/2013 |
| CN | 103477448 A | 12/2013 |
| CN | 103676361 A | 3/2014 |
| CN | 103839865 A | 6/2014 |
| CN | 104571698 A | 4/2015 |
| CN | 104850269 A | 8/2015 |

OTHER PUBLICATIONS

Jun. 7, 2017—(CN) Office Action Appn 201510319716.2 with English Translation.

* cited by examiner

TOUCH PANEL AND TOUCH DISPLAY DEVICE

The application is a U.S. National Phase Entry of International Application No. PCT/CN2015/091165 filed on Sep. 30, 2015, designating the United States of America and claiming priority to Chinese Patent Application No. 201510319716.2, filed Jun. 10, 2015. The present application claims priority to and the benefit of the above-identified applications and the above-identified applications are incorporated by reference herein in their entirety.

TECHNICAL FIELD

At least one embodiment of the present disclosure relates to a touch panel and a touch display device.

BACKGROUND

Touch panel, as a brand new kind of human-computer interaction device, has a vivid and intuitive operation interface, satisfies operation habits of the human beings, and allows entertainment and business to become more vivid and relax. Touch panels include a resistive type, a capacitive type, an infrared optical type, etc. A resistive touch panel determines a touch point by means of the change of the resistance between two layers of electrodes or conduction due to pressing. A capacitive touch panel determines a touch point by means of the capacitance variation caused by, e.g., the touch of a human body. An infrared optical touch panel determines a touch point when, e.g., a finger blocks the receipt of infrared light rays. Capacitive touch panels are widely applied in the field of electronic products due to the advantages of high transparency, durability, multi-point touch, etc.

Currently, the market of electronic products is continuously expanded, and one problem to be solved is the large display energy consumption of touch display screens. In one aspect, mobile touch display devices such as mobile phones, tablet personal computers (PCs) and e-book readers must be portable and cannot be charged at any moment. In another aspect, along with the development of mobile internet and the emerging of various applications, people's time in using the mobile touch display devices such as mobile phones, tablet PCs and e-book readers is continuously increased. The service time of batteries of the devices is generally short, so frequent charging is required, which brings inconvenience to user's daily life. This problem always bothers consumers and manufacturers and also points out the direction in need of attention in the future. In order to solve the problem, the current solution is mainly to increase the battery capacity of a product. However, the increase of the battery capacity not only can increase the volume and the weight of an electronic product such as a mobile phone or a tablet PC and affect the portability and the aesthetic perception of the product but also can lead to defects such as high heat productivity and high cost. Moreover, due to the size limitation of a mobile touch display device such as a mobile phone, a tablet PC or an e-book reader, the problem cannot be solved only by increasing the battery capacity.

SUMMARY

At least one embodiment of the present disclosure provides a touch panel and a touch display device. A transparent thin film photovoltaic cell disposed in the touch panel can charge an electronic product, so that the service time of the electronic product can be prolonged.

At least an embodiment of the present disclosure provides a touch panel, comprising a base substrate and a touch electrode layer and a transparent thin film photovoltaic cell that are disposed on the base substrate; the touch electrode layer and the transparent thin film photovoltaic cell are mutually superimposed and disposed on a same side of the base substrate, and a transparent insulating layer is disposed between the touch electrode layer and the transparent thin film photovoltaic cell; or the touch electrode layer and the transparent thin film photovoltaic cell are respectively disposed on either side of the base substrate; and the transparent thin film photovoltaic cell includes an n-doped graphene layer and a p-doped graphene layer.

For example, in the touch panel provided at least one embodiment of the present disclosure, the transparent thin film photovoltaic cell further includes a graphene layer which is disposed between the n-doped graphene layer and the p-doped graphene layer.

For example, in the touch panel provided at least one embodiment of the present disclosure, the touch panel further comprises a control circuit, a first lead and a second lead; the n-doped graphene layer and the p-doped graphene layer are respectively connected to the control circuit through the first lead and the second lead; the first lead and the n-doped graphene layer are arranged in a same layer; the second lead and the p-doped graphene layer are arranged in a same layer; and the first lead and the second lead are mutually staggered.

For example, in the touch panel provided at least one embodiment of the present disclosure, the touch panel further comprises a control circuit, a first electrode and a second electrode; the n-doped graphene layer and the p-doped graphene layer are respectively connected to the control circuit through the first electrode and the second electrode.

For example, in the touch panel provided at least one embodiment of the present disclosure, the first electrode and the second electrode are arranged in a same layer and spaced from each other.

For example, in the touch panel provided at least one embodiment of the present disclosure, the control circuit is configured to control the transparent thin film photovoltaic cell to charge the rechargeable battery or not.

For example, in the touch panel provided at least one embodiment of the present disclosure, the control circuit includes a photosensitive unit which is configured to detect light intensity, so as to control whether to charge the rechargeable battery.

For example, in the touch panel provided at least one embodiment of the present disclosure, the touch electrode layer includes a plurality of touch driving electrodes and/or a plurality of touch sensing electrodes.

For example, in the touch panel provided at least one embodiment of the present disclosure, the transparent insulating layer includes any one selected from the group consisting of a transparent optical clear adhesive layer, a SiNxOy layer, a SiO2 layer and an alumina layer.

For example, in the touch panel provided at least one embodiment of the present disclosure, a case the touch electrode layer and the transparent thin film photovoltaic cell are disposed on the same side of the base substrate, the transparent thin film photovoltaic cell is disposed between the base substrate and the touch electrode layer, or the touch electrode layer is disposed between the base substrate and the transparent thin film photovoltaic cell.

For example, in the touch panel provided at least one embodiment of the present disclosure, the base substrate at least includes a first area and a second area; the second area is adjacent to and encircles the first area; the first area is a touch area, and the second area is a peripheral area; the transparent thin film photovoltaic cell is entirely disposed in the first area; or a part of the transparent thin film photovoltaic cell is disposed in the first area.

For example, in the touch panel provided at least one embodiment of the present disclosure, in a case a part of the transparent thin film photovoltaic cell is disposed in the first area, the transparent thin film photovoltaic cell includes a plurality of sub-transparent thin film photovoltaic cells.

At least an embodiment of the present disclosure provides a touch display device, comprising any one of the above touch panels.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

Figure 1:
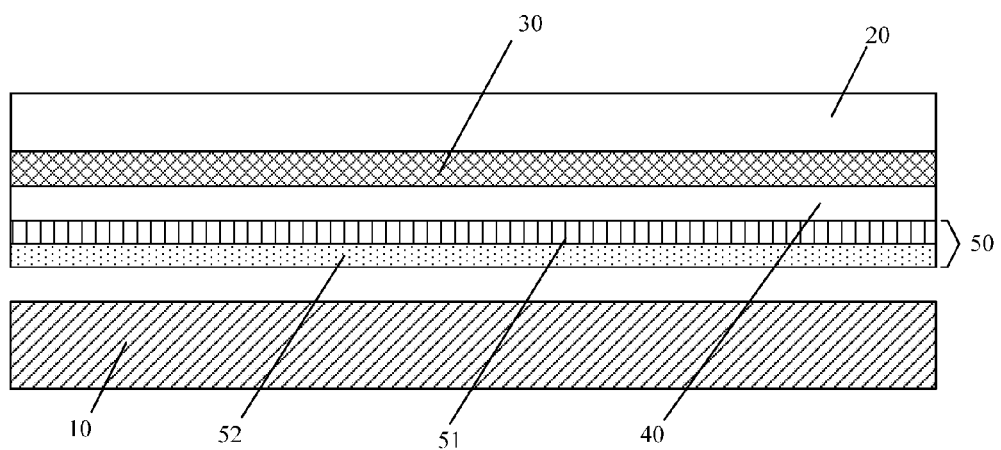
FIG. 1 is a schematic sectional partial view of a touch panel provided by an embodiment of the present disclosure.

REFERENCE NUMERALS 10, 110—display module; 20, 120—base substrate; 30—touch electrode layer; 40, 140, 240, 340, 540, 640—transparent insulating layer; 50, 150, 250, 350, 450, 550, 650, 750, 850—transparent thin film photovoltaic cell; 51, 151, 251, 352, 451, 551, 651, 751, 851—n-doped graphene layer; 52, 152, 252, 351, 452, 552, 652, 752, 852—p-doped graphene layer; 131, 231, 331, 431, 531, 631—touch sensing electrode; 132, 232, 332, 432, 532, 632—touch driving electrode; 1501—sub-transparent thin film photovoltaic cell; 161—first lead; 162—second lead; 163—first electrode; 164—second electrode 171—first area; 172—second area; 191—control circuit; 192—photosensitive unit; 193—rechargeable battery; 194—driver IC or drive circuit; 210, 310, 410, 510, 610, 710, 810—first substrate; 211, 311, 411, 811—liquid crystal layer; 220, 320, 420, 520, 620, 720, 820—second substrate; 253, 553, 653, 753—graphene layer; 280, 380, 480, 580, 680, 780, 880—cover plate; 511, 611, 711—light emitting unit layer.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

In the embodiments of the present disclosure, by utilization of the transparent characteristic, a transparent thin film photovoltaic cell is integrated into a touch panel, so that electric energy can be continuously supplied to the touch panel by means of the transparent thin film photovoltaic cell in the environment of light illumination (e.g., back light or sun light), so that the service time of the touch panel can be prolonged. Moreover, as the transparent thin film photovoltaic cell has a high light transmission rate and a small thickness, the display and the size of the touch panel would not be significantly affected.

At least one embodiment of the present disclosure provides a touch panel, which comprises a base substrate and a touch electrode layer and a transparent thin film photovoltaic cell that are disposed on the base substrate. The touch electrode layer and the transparent thin film photovoltaic cell are mutually superimposed and disposed on the same side of the base substrate, and a transparent insulating layer is disposed between the touch electrode layer and the transparent thin film photovoltaic cell; or the touch electrode layer and the transparent thin film photovoltaic cell are respectively disposed on either side of the base substrate; and the transparent thin film photovoltaic cell includes an n-doped graphene layer and a p-doped graphene layer which are superimposed to each other.

For instance, the touch electrode layer includes a plurality of touch driving electrodes and/or a plurality of touch sensing electrodes.

For instance, as illustrated in FIG. 1, the touch panel provided by one embodiment of the present disclosure comprises a base substrate 20, a touch electrode layer 30 disposed on the base substrate, a transparent insulating layer 40 disposed on the touch electrode layer 30, an n-doped graphene layer 51 disposed on the transparent insulating layer 40, and a p-doped graphene layer 52 disposed on the n-doped graphene layer. For instance, a transparent thin film photovoltaic cell 50 is formed by the n-doped graphene layer 51 and the p-doped graphene layer 52. For instance, the touch panel may be disposed on a display module 10. When ambient light and/or light emitted by the display module 10 runs through the transparent thin film photovoltaic cell 50 formed by the n-doped graphene layer 51 and the p-doped graphene layer 52, the transparent thin film photovoltaic cell 50 can generate an electrical current for supplying power for and/or charging the touch panel or charging the secondary battery of the entire device (e.g., a mobile phone and a tablet PC). For instance, the display module 10 may be an LCD module or an OLED display module.

Description will be given below with reference to the preferred embodiments.

First Embodiment

Figure 2:
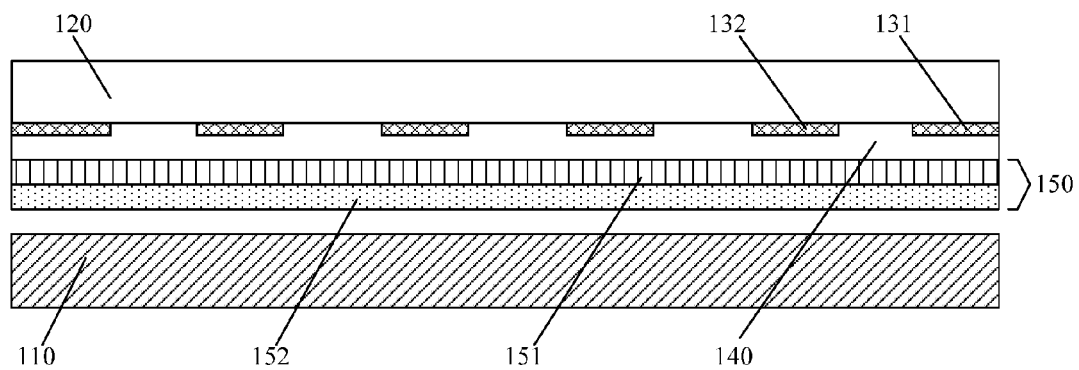
FIG. 2 is a schematic sectional partial view of another touch panel provided by an embodiment of the present disclosure.

The present embodiment provides a touch panel. As illustrated in FIG. 2, the touch panel comprises a base substrate 120, a plurality of touch sensing electrodes 131 and a plurality of touch driving electrodes 132 disposed on the base substrate, a transparent insulating layer 140 disposed on the plurality of touch sensing electrodes 131 and the plurality of touch driving electrodes 132, an n-doped graphene layer 151 disposed on the transparent insulating layer 140, and a p-doped graphene layer 152 disposed on the n-doped graphene layer 151. For instance, the touch panel provided by the embodiment may be a one-glass-solution (OGS) touch panel.

For instance, the transparent insulating layer 140 may be a transparent optically clear adhesive (OCA) layer or an inorganic insulating layer, but not limited thereto. For instance, the inorganic insulating layer includes any one selected from the group consisting of a SiNxOy layer, a $SiO_2$ layer and an alumina layer, but not limited thereto, as long as the inorganic insulating layer is a transparent thin film having an insulating function. The transparent OCA layer is, for instance, an OC photoresist layer (a transparent photoresist layer).

For instance, the forming method of the n-doped graphene layer may include, but not limited to, the following steps:
(1) One graphene layer is formed on a metal substrate. For instance, the graphene layer may be formed by a chemical vapor deposition (CVD) method, but not limited thereto. For instance, the metal substrate may be a copper or nickel foil, but not limited thereto.
(2) An n-doped graphene layer is formed by doping the graphene layer formed on the metal substrate. For instance, the n-doped graphene layer is formed by nitrogen doping, but not limited thereto.
(3) A polymethyl methacrylate (PMMA) film is formed on the n-doped graphene layer formed on the metal substrate. For instance, this step may be conducted as follows: performing drop-coating of an organic solvent solution containing PMMA on a surface of the n-doped graphene layer formed on the substrate, allowing the organic solvent solution containing PMMA to uniformly coat the graphene film by a spin coater, placing the metal substrate on a heating platform, drying the solvent, and obtaining the PMMA film.
(4) The metal substrate is removed. For instance, the substrate may be etched away by means of an etching liquid. For instance, the etching liquid may be a $FeCl_3$ solution, a $Fe(NO_3)_3$ solution or a $Fe_2(SO_4)_3$ solution. For instance, the concentration of the etching liquid may be 0.5-2 mol/L.
(5) The n-doped graphene layer on the PMMA film is transferred to the base substrate. As graphene has strong physical adsorption ability, the n-doped graphene layer can be adsorbed to the base substrate.
(6) The PMMA film is removed. For instance, the PMMA film may be dissolved by a solvent. The solvent, for instance, may be acetone. The PMMA film may also be removed by an annealing method.

For instance, the forming method of the n-doped graphene layer may also include the step (7): forming a required pattern by photolithography. For instance, the step (7) may be executed after the step (1) and before the step (3), but not limited thereto. For instance, the step (7) may be executed after the step (1) and before the step (2), or executed after the step (2) and before the step (3), but not limited thereto.

For instance, the forming method of the p-doped graphene layer may include, but not limited to, the following steps:
(1) One graphene layer is formed on a metal substrate. For instance, the graphene layer may be formed by a CVD method, but not limited thereto. For instance, the metal substrate may be a copper or nickel foil, but not limited thereto.
(2) The p-doped graphene layer is formed by doping the graphene layer formed on the metal substrate. For instance, the p-doped graphene layer may be formed by oxygen doping or boron doping, but not limited thereto.
(3) A PMMA film is formed on the p-doped graphene layer formed on the metal substrate. For instance, the step may be conducted as follows: performing drop-coating of an organic solvent solution containing PMMA on a surface of the p-doped graphene layer formed on the substrate, allowing the organic solvent solution containing PMMA to uniformly coat the graphene film by a spin coater, placing the metal substrate on a heating platform, drying the solvent, and obtaining the PMMA film.
(4) The metal substrate is removed. For instance, the substrate may be etched away by an etching liquid. For instance, the etching liquid may be a $FeCl_3$ solution, a $Fe(NO_3)_3$ solution or a $Fe_2(SO_4)_3$ solution. For instance, the concentration of the etching liquid may be 0.5-2 mol/L.
(5) The p-doped graphene layer on the PMMA film is transferred to the base substrate. As graphene has strong physical adsorption ability, the p-doped graphene layer may be adsorbed to the base substrate.
(6) The PMMA film is removed. For instance, the PMMA film may be dissolved by a solvent. The solvent, for instance, may be acetone. The PMMA film may also be removed by an annealing method.

For instance, the forming method of the p-doped graphene layer may also include the step (7): forming a required pattern by photolithography. For instance, the step (7) may be executed after the step (1) and before the step (3), but not limited thereto. For instance, the step (7) may be executed after the step (1) and before the step (2), or executed after the step (2) and before the step (3), but not limited thereto. For instance, the forming method of the n-doped graphene layer may also be that the graphene layer is transferred to the base substrate and subsequently the n-doped graphene layer is formed by doping.

For instance, the forming method of the p-doped graphene layer may also be that the graphene layer is transferred to the base substrate and subsequently the p-doped graphene layer is formed by doping.

For instance, the nitrogen doping of the graphene layer may be that the graphene layer is subjected to high-temperature annealing in ammonia gas and subsequently the n-doped graphene layer is formed. For instance, the high-temperature annealing temperature may be 500□±50□.

For instance, the oxygen doping of the graphene layer may be that the graphene layer is subjected to low-temperature annealing in an oxygen atmosphere and subsequently the p-doped graphene layer is formed. For instance, the low-temperature annealing temperature may be 200□±50□.

For instance, the n-doped graphene layer may be a nitrogen-doped (N-doped) graphene layer. The p-doped graphene layer may be an oxygen-doped (O-doped) graphene layer or a boron-doped (B-doped) graphene layer. For instance, the n-doped graphene layer and the p-doped graphene layer may be a single-layer, double-layer or three-layer structure.

A pn junction is formed between an n-doped graphene layer 151 and a p-doped graphene layer 152. The touch panel may cover a display module 110. When ambient light and/or light emitted by the display module 110 runs through a transparent thin film photovoltaic cell 150, the transparent thin film photovoltaic cell 150 may generate an electric current for supplying power to and/or charging the touch panel. For instance, the display module may be an LCD module or an OLED display module.

For instance, the position of the transparent thin film photovoltaic cell 150 may be exchanged in position with the touch electrode layer 30 formed by touch sensing electrodes 131 and touch driving electrodes 132. That is to say, the touch panel comprises a base substrate 120, an n-doped graphene layer 151 disposed on the base substrate, a p-doped graphene layer 152 disposed on the n-doped graphene layer 151, a transparent insulating layer 140 disposed on the p-doped graphene layer 152, and a touch electrode layer 30 disposed on the transparent insulating layer 140.

It should be noted that the position of the n-doped graphene layer 151 and the position of the p-doped graphene layer 152 in the embodiment of the present disclosure may be exchanged. That is to say, the p-doped graphene layer 152 is closer to the base substrate 120 than the n-doped graphene layer 151.

When the transparent insulating layer 140 in the embodiment adopts a transparent OCA layer, the transparent thin film photovoltaic cell 150 may be formed on the touch panel by utilization of the insulating property of the transparent OCA layer on the touch panel, so an additional transparent insulating layer is not required. Thus, materials can be saved, so that the production process can be reduced, and hence the cost can be saved. In addition, compared with other touch panels, the structure has a low thickness, cannot be overly heavy due to the added transparent thin film photovoltaic cell 150, and has a good market prospective in the market environment in pursuit of light and thin products.

Figure 3:
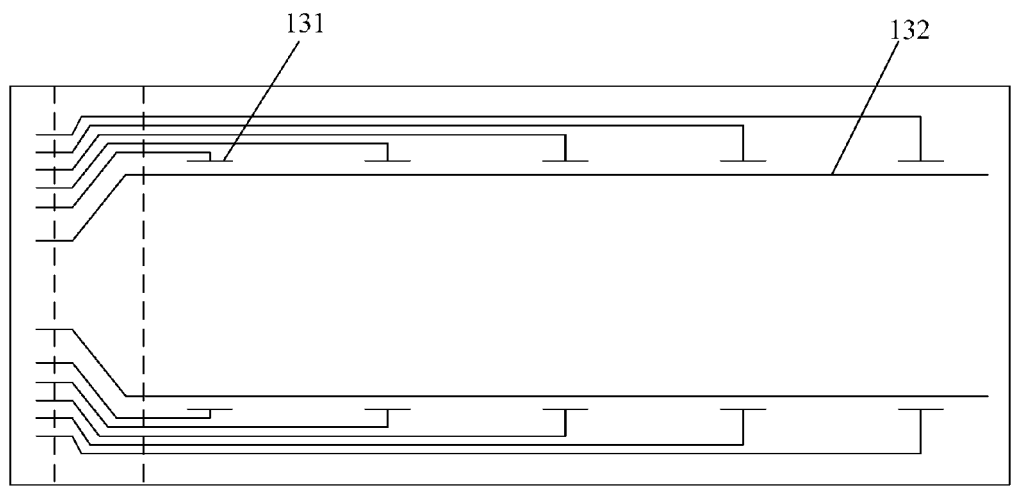
FIG. 3 is a schematic plan view of a touch electrode layer provided by an embodiment of the present disclosure.

For instance, as illustrated in FIG. 3, the plurality of touch sensing electrodes 131 and the plurality of touch driving electrodes 132 may be formed on the base substrate in the same layer, e.g., formed by the same transparent conductive film. For instance, one side of one touch driving electrode 132 corresponds to four touch sensing electrodes 131; and four touch sensing electrodes 131 may also be disposed on the other side of the touch driving electrode 132, so that a structure that one touch driving electrode 132 corresponds to eight touch sensing electrodes 131 can be formed. For instance, the structure may be taken as a basic touch unit and can be repeatedly arranged in an array in a touch area. No specific limitation will be given here to the structure of the touch electrode layer. For instance, the touch driving electrodes 132 and the touch sensing electrodes 131 may be exchanged. In the case of the variation of the capacitance between a touch driving electrode (Tx) and a touch sensing electrode (Rx) by, e.g., finger touch, signal output over the touch sensing electrode (Rx) caused by coupling of a touch drive signal is detected, and hence a touch position can be determined. This means may be adopted to achieve touch determination.

It should be noted that the touch sensing electrodes 131 and the touch driving electrodes 132 in the embodiment are not limited to the above structure. For instance, a bridge structure may also be adopted to them.

Figure 4A:
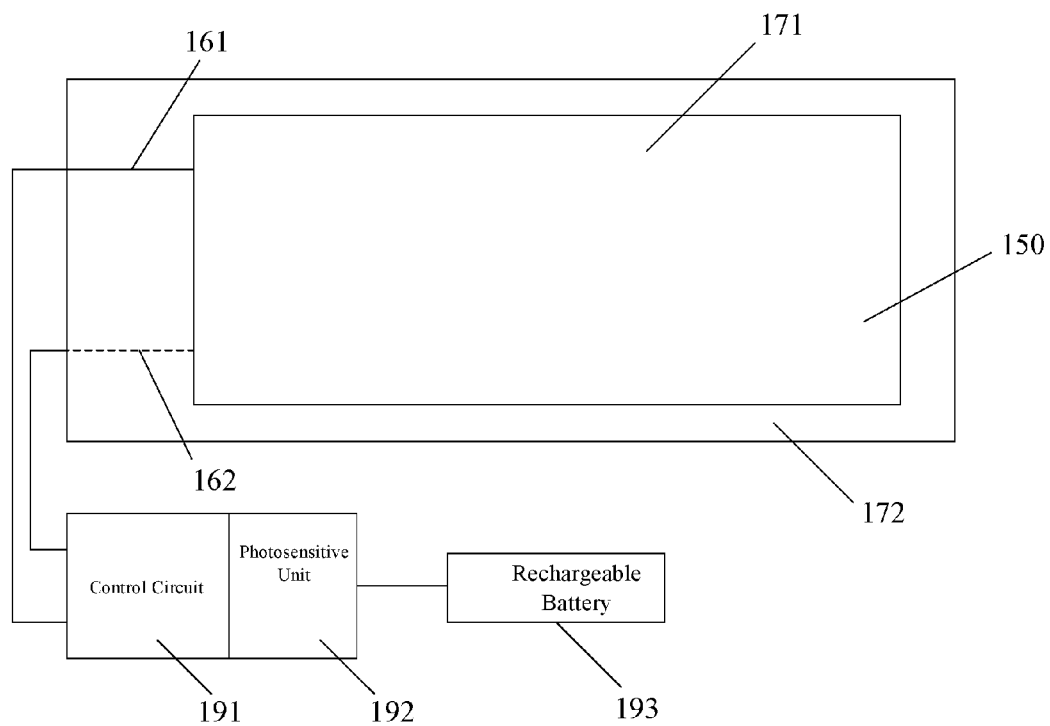
FIG. 4a is a schematic plan view of a thin film photovoltaic cell in a touch panel provided by an embodiment of the present disclosure.
Figure 5:
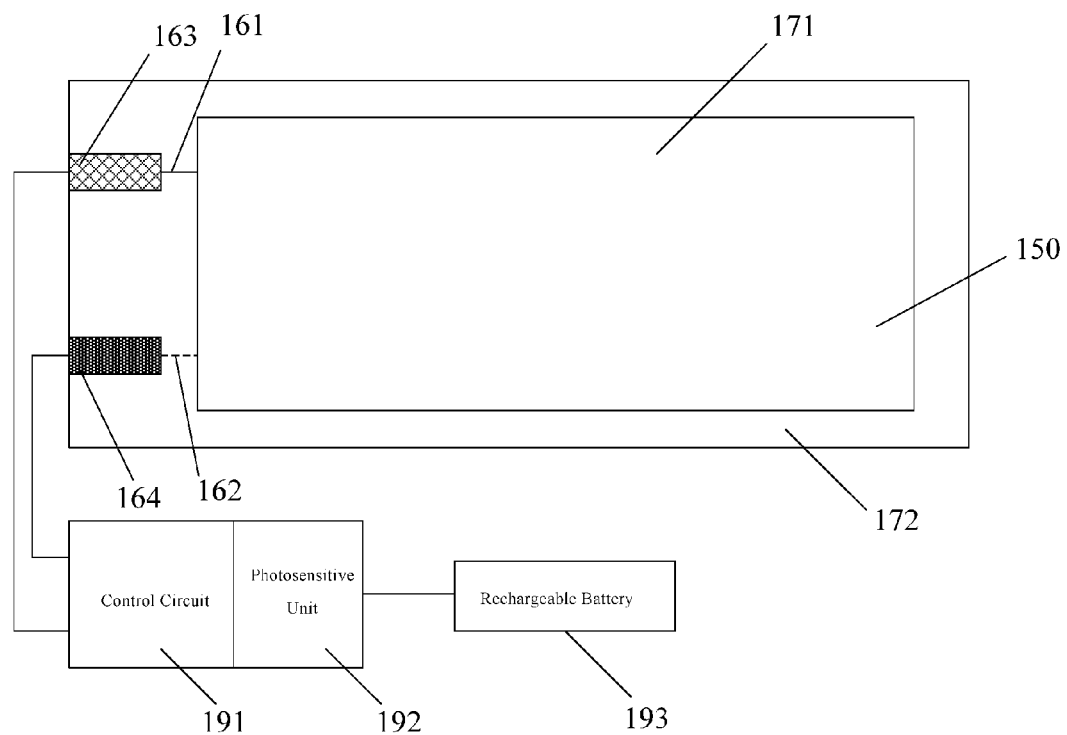
FIG. 5 is a schematic plan view of a thin film photovoltaic cell in another touch panel provided by an embodiment of the present disclosure.

Moreover, for instance, as illustrated in FIGS. 4a and 5, the base substrate at least includes a first area 171 and a second area 172. The second area 172 is adjacent to and encircles the first area 171. For instance, the first area 171 is a touch area, and the second area 172 is a peripheral area. The transparent thin film photovoltaic cell 150 may be entirely disposed in the first area 171.

For instance, as illustrated in FIG. 4a, the n-doped graphene layer and the p-doped graphene layer are respectively connected to a control circuit 191 through a first lead 161 and a second lead 162.

Figure 4B:
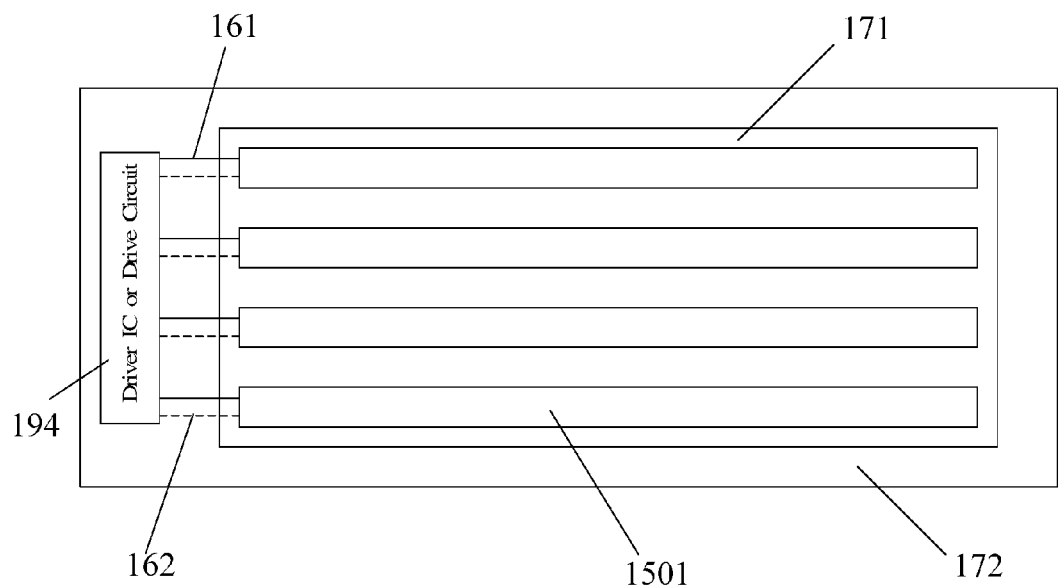
FIG. 4b is a schematic plan view of a thin film photovoltaic cell in another touch panel provided by an embodiment of the present disclosure.

For instance, as illustrated in FIG. 4b, the transparent thin film photovoltaic cell 150 includes a plurality of sub-transparent thin film photovoltaic cells 1501. For instance, each sub-transparent thin film photovoltaic cell is in a shape of strip. The plurality of sub-transparent thin film photovoltaic cells is disposed in the first area 171, and a gap is formed between adjacent sub-transparent thin film photovoltaic cells. The n-doped graphene layer and the p-doped graphene layer in each sub-transparent thin film photovoltaic cell may be connected to the control circuit 191 through the first lead 161 and the second lead 162. For instance, the control circuit 191 may also be replaced by a driver IC/a drive circuit 194. That is to say, the n-doped graphene layer and the p-doped graphene layer in each sub-transparent thin film photovoltaic cell are respectively connected to the driver IC/the drive circuit 194 through the first lead 161 and the second lead 162.

It should be noted that description is given in the embodiment and the accompanying drawings by taking the case that the number of both the first lead and the second lead is one respectively as an example. There may be first leads and the second leads. For instance, the n-doped graphene layer in the transparent thin film photovoltaic cell or the sub-transparent thin film photovoltaic cell is connected to the driver IC/the drive circuit 194 through a plurality of first leads 161. For instance, the p-doped graphene layer in the transparent thin film photovoltaic cell or the sub-transparent thin film photovoltaic cell is connected to the driver IC/the drive circuit 194 through a plurality of second leads 162.

For instance, the first leads 161 and the n-doped graphene layer are arranged in the same layer (e.g., may be formed by the same patterning process), and the second leads 162 and the p-doped graphene layer are arranged in the same layer (e.g., may be formed by the same patterning process). The first leads 161 and the second leads 162 are mutually staggered.

It should be noted that mutual staggering in the embodiment, for instance, indicates that projections on the base substrate are not overlapped with each other. Mutual staggering of the first lead and the second lead, for instance, indicates that projections of the first leads and the second leads on the base substrate are not overlapped with each other. The following embodiments may be the same as the embodiment.

The first leads 161 and the second leads 162 may be formed by photolithography. For instance, when enough light intensity is irradiated to the transparent thin film photovoltaic cell 150, the electrical current generated by each sub-transparent thin film photovoltaic cell may be respectively directly connected to the driver IC through a first lead 161 and a second lead 162. Thus, the service time of the touch panel can be prolonged.

It should be noted that the shape of the sub-transparent thin film photovoltaic cell 1501 is not limited to a strip shape and may also be in another shape in addition to the shape of strip, e.g., the shape of comb, wavy, triangular, or trapezoidal. When a part of the transparent thin film photovoltaic cell 150 is disposed in the touch area 171, the coverage range and the proportion of the transparent thin film photovoltaic cell may be adjusted according to actually required aperture ratio. For instance, when a high aperture ratio is required, a large gap may be formed between the sub-transparent thin film photovoltaic cells 1501. In the case of an enough aperture ratio, a small gap may be formed between the sub-transparent thin film photovoltaic cells 1501.

For instance, as illustrated in FIG. 5, the touch panel may further comprise a first electrode 163 and a second electrode 164. The n-doped graphene layer of the transparent thin film photovoltaic cell 150 is connected with the control circuit 191 through the first electrode 163. The p-doped graphene layer of the transparent thin film photovoltaic cell 150 is connected with the control circuit 191 through the second electrode 164. For instance, the first electrode 163 and the second electrode 164 may be arranged in the same layer and spaced from each other. For instance, the first electrode 163 and the second electrode 164 may be made from metal.

It should be noted that "being spaced" in the embodiment, for instance, indicates that there is a gap, for instance, and indicates that projections on the base substrate are not overlapped with each other. The arrangement of being spaced of the first electrode and the second electrode, for instance, indicates that there is a gap between the first electrode and the second electrode and projections of the first electrode and the second electrode on the base substrate are not overlapped with each other. The following embodiments may be the same as the embodiment.

It should be understood herein that: in the present disclosure, "same layer" indicates that a layer provided with a specific pattern is formed by a same film forming process and the layer structure is formed by same one patterning process via a same mask. As to different specific patterns, one patterning process may include an exposure process, a development process or an etching process for times. The specific pattern in the formed layer structure may be continuous or discontinuous. The formed patterns may also have different heights or different thicknesses.

It should be noted that: in the embodiment of the present disclosure, the patterning process may only include photolithography, include photolithography and etching process, or may include printing, ink jetting or other processes for forming a specific pattern. The photolithography includes technological processes such as film forming, exposing and developing, and a pattern is formed with the help of photoresist, a mask, an exposure machine, etc. A patterning process may be selected correspondingly according to the structure formed in the embodiment of the present disclosure.

For instance, as illustrated in FIGS. 4a and 5, the touch panel may further comprise a rechargeable battery 193. The control circuit 191 may be configured to control the transparent thin film photovoltaic cell 150 to charge the rechargeable battery 193 or not.

For instance, as illustrated in FIGS. 4a and 5, the control circuit 191 may further include a photosensitive unit 192 which is configured to detect the light intensity, so as to control whether to charge the rechargeable battery 193.

Figure 6:
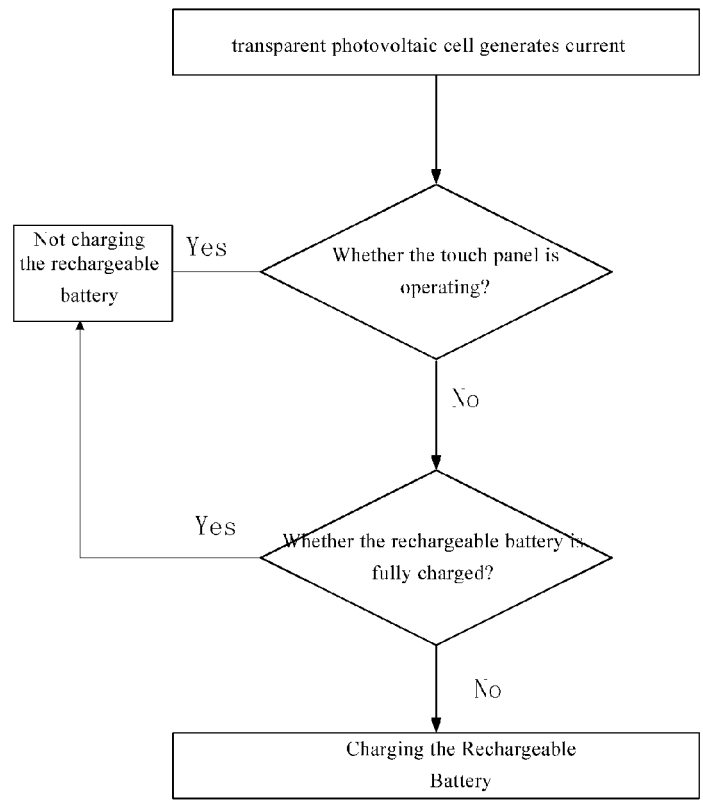
FIG. 6 is a control flow chart of a touch panel provided by an embodiment of the present disclosure.

For instance, FIG. 6 is a control flow chart of a touch panel provided by the embodiment. The control flow may be as follows.

In the case of light illumination of enough intensity, the transparent thin film photovoltaic cell generates an electrical current. The control circuit detects whether the touch panel is operating. If the touch panel is operating, the control circuit controls the transparent thin film photovoltaic cell to not charge the rechargeable battery. If the touch panel does not operate, the control circuit then detects whether the rechargeable battery is fully charged. If the rechargeable battery is not fully charged, the control circuit controls the transparent thin film photovoltaic cell to charge the rechargeable battery. Due to the above control flow, the touch panel provided by at least one embodiment of the present disclosure can be as follows: in the case of enough light illumination, when the touch panel does not operate, the rechargeable battery can be charged and the electric energy can be stored. Thus, the service time of the touch panel can be significantly prolonged and the charging frequency of an external power source can be not needed.

It should be noted that the control flow of the touch panel provided by the embodiment of the present disclosure is not limited to the above. For instance, when the touch panel operates, the rechargeable battery can also be charged. Thus, the effect of long operation duration can be achieved, and even the effect of charging the rechargeable battery only by the thin film photovoltaic battery without the external power source can be achieved. If the transparent thin film photovoltaic cell can generate enough electrical power, the electrical current can also directly enter the control circuit, so as to control the operation of the touch panel.

Second Embodiment

Figure 7A:
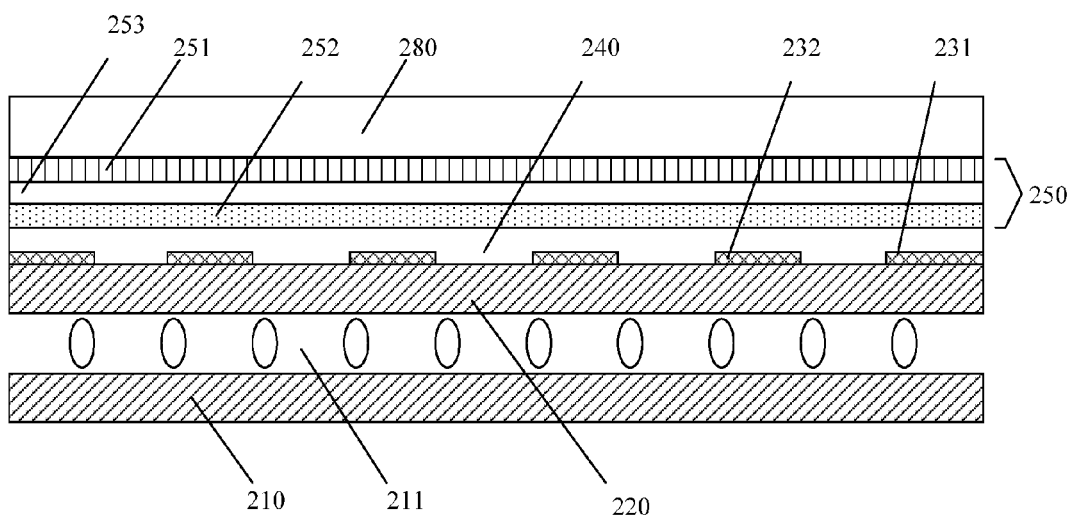
FIG. 7a is a schematic sectional partial view of another liquid crystal touch panel provided by an embodiment of the present disclosure.

The embodiment provides a touch panel, which is an on-cell capacitive touch display panel. As illustrated in FIG. 7a, the touch panel comprises a first substrate 210, a second substrate 220, a liquid crystal layer 211 disposed between the first substrate 210 and the second substrate 220, a plurality of touch sensing electrodes 231 and a plurality of touch driving electrodes 232 disposed on one side of the second substrate 220 away from the liquid crystal layer 211, a transparent insulating layer 240 disposed on the plurality of touch sensing electrodes 231 and the plurality of touch driving electrodes 232, a p-doped graphene layer 252 disposed on the transparent insulating layer 240, a graphene layer 253 disposed on the p-doped graphene layer 252, and an n-doped graphene layer 251 disposed on the graphene layer 253. A cover plate 280 may be disposed on the n-doped graphene layer 251.

For instance, the material of the transparent insulating layer 240 may refer to the description to the transparent insulating layer in the first embodiment. No redundant description will be given here.

For instance, the n-doped graphene layer 251 and the p-doped graphene layer 252 may be formed by way of the forming method in the first embodiment. The second substrate in the embodiment is the base substrate in the first embodiment.

For instance, the forming method of the graphene layer may include but not limited to the following steps:

(1) One graphene layer is formed on a metal substrate. For instance, the graphene layer may be formed by a CVD method, but not limited thereto. For instance, the metal substrate may be a copper or nickel foil, but not limited thereto.

(2) A PMMA film is formed on the graphene layer that is formed on the metal substrate. For instance, the step may be as follows: performing drop-coating of an organic solvent solution containing PMMA on a surface of the n-doped graphene layer formed on the substrate, allowing the organic solvent solution containing PMMA to uniformly coat the graphene film by a spin coater, placing the metal substrate on a heating platform, drying the solvent, and obtaining the PMMA film.

(3) The metal substrate is removed. For instance, the substrate may be etched away by an etching liquid. For instance, the etching liquid may be a $FeCl_3$ solution, a $Fe(NO_3)_3$ solution or a $Fe_2(SO_4)_3$ solution. For instance, the concentration of the etching liquid may be 0.5-2 mol/L.

(4) The graphene layer on the PMMA film is transferred to the second substrate (base substrate). As graphene has strong physical adsorption ability, the graphene layer may be adsorbed to the second substrate (base substrate).

(5) The PMMA film is removed. For instance, the PMMA film may be dissolved by a solvent. The solvent, for instance, may be acetone. The PMMA film may also be removed by an annealing method.

Figure 7B:
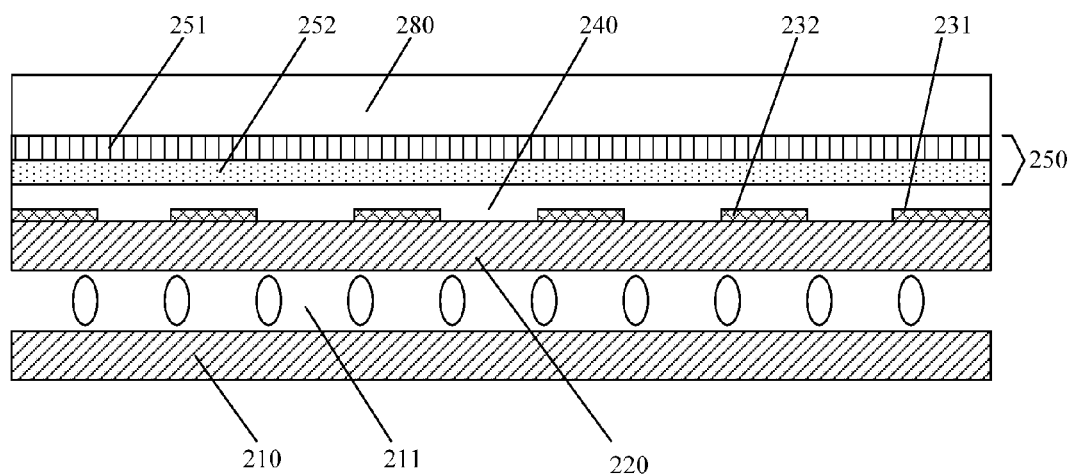
FIG. 7b is a schematic sectional partial view of another liquid crystal touch panel provided by an embodiment of the present disclosure.

For instance, the forming process of the graphene layer may also include the step (6): forming a required pattern by photolithography. For instance, the step (6) may be executed after the step (1) and before the step (2), but not limited thereto. For instance, the graphene layer 253 is an i-type layer, and a transparent thin film photovoltaic cell 250 is formed by the n-doped graphene layer 251, the graphene layer 253 and the p-doped graphene layer 252. The i-type layer may be taken as a photocurrent generating layer and a transport layer, and the n-doped graphene layer and the p-doped graphene layer each may be an electrode layer which is configured to generate a built-in electrical filed for accelerating carrier drift in the i-type layer and to collect photo-induced carriers. A p-i-n structure is formed by the n-doped graphene layer 251, the graphene layer 253 and the n-doped graphene layer 252. It should be noted that the transparent thin film photovoltaic cell in the embodiment may also not include any i-type layer. As illustrated in FIG. 7b, a transparent thin film photovoltaic cell 250 having a p-n structure is formed by the n-doped graphene layer 251 and the p-doped graphene layer 252. When ambient light and/or back light passing through the second substrate 220 runs through the transparent thin film photovoltaic cell 250, the transparent thin film photovoltaic cell 250 may generate an electrical current for supplying power to and/or charging the touch panel.

For instance, the position of the transparent thin film photovoltaic cell 250 may be exchanged with the position of a touch electrode layer formed by the touch sensing electrodes 231 and the touch driving electrodes 232.

It should be noted that: the second substrate in the touch panel provided by the embodiment of the present disclosure may include a first area and a second area; the n-doped graphene layer and the p-doped graphene layer of the transparent thin film photovoltaic cell may also be respectively connected with a control circuit or a driver IC through a first lead and a second lead; a first electrode and a second electrode may also be arranged; the control circuit may also include a photosensitive unit; and the transparent thin film photovoltaic cell may also include a plurality of sub-transparent thin film photovoltaic cells. The first area, the second area, the first lead, the second lead, the first electrode, the second electrode, the control circuit, the photosensitive unit, the driver IC, the n-doped graphene layer, the p-doped graphene layer, the touch sensing electrodes, the touch driving electrodes, the sub-transparent thin film photovoltaic cells, the operation of charging the touch panel by the transparent thin film photovoltaic cell, and the like may all refer to the relevant accompanying drawings and the relevant description in the first embodiment. No further redundant description will be given here.

The structure and the layout of the touch electrode layer in the touch panel provided by the embodiment may be the same as or similar to those of the touch electrode layer in the first embodiment. The second substrate 220 in the embodiment may be not only an opposing substrate (the opposing substrate is arranged opposite to an array substrate and, for instance, may be a color filter (CF) substrate) of a liquid crystal touch panel but also a base substrate of the thin film photovoltaic cell. Thus, the materials can be saved, so that the production process can be reduced, and hence the cost can be saved.

Third Embodiment

Figure 8:
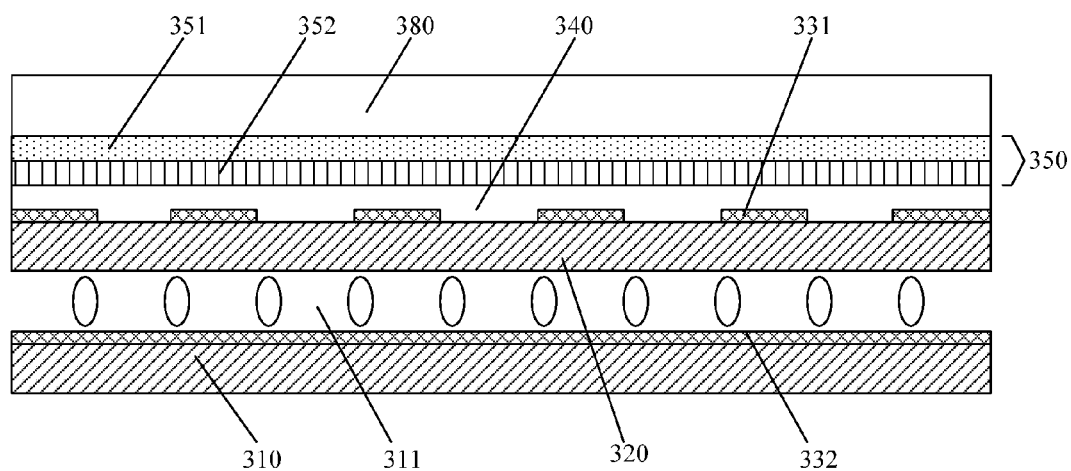
FIG. 8 is a schematic sectional partial view of another liquid crystal touch panel provided by an embodiment of the present disclosure.

The embodiment provides a touch panel, which is an on-cell capacitive touch display panel. As illustrated in FIG. 8, the touch panel comprises a first substrate 310, a second substrate 320, and a liquid crystal layer 311 disposed between the first substrate 310 and the second substrate 320. The touch panel further comprises a plurality of touch driving electrodes 332 disposed on one side of the first substrate 310 facing the liquid crystal layer 311, a plurality of touch sensing electrodes 331 disposed on one side of the second substrate 320 away from the liquid crystal layer 311, a transparent insulating layer 340 disposed on the plurality of touch sensing electrodes 331, an n-doped graphene layer 352 disposed on the transparent insulating layer 340, and a p-doped graphene layer 351 disposed on the n-doped graphene layer 352. For instance, a cover plate 380 is disposed on the p-doped graphene layer 351.

For instance, the material of the transparent insulating layer 3 may refer to the description on the transparent insulating layer in the first embodiment. No further redundant description will be given here.

For instance, the p-doped graphene layer 351 and the n-doped graphene layer 352 may be formed by way of the forming method in the first embodiment. The second substrate in the embodiment is the base substrate in the first embodiment.

For instance, a transparent thin film photovoltaic cell 350 is formed by the p-doped graphene layer 351 and the n-doped graphene layer 352. A pn junction is formed between the p-doped graphene layer 351 and the n-doped graphene layer 352. When ambient light and/or back light passing through the second substrate 320 runs through the transparent thin film photovoltaic cell 350, the transparent thin film photovoltaic cell 350 may generate an electrical current for supplying power to and/or charging the touch panel.

It should be noted that: the second substrate in the touch panel provided by the embodiment of the present disclosure may include a first area and a second area; the n-doped graphene layer and the p-doped graphene layer of the transparent thin film photovoltaic cell may also be respectively connected with a control circuit or a driver IC through a first lead and a second lead; a first electrode and a second electrode may also be arranged; the control circuit may also include a photosensitive unit; and the transparent thin film photovoltaic cell may also include a plurality of sub-transparent thin film photovoltaic cells. The first area, the second area, the first lead, the second lead, the first electrode, the second electrode, the control circuit, the photosensitive unit, the driver IC, the n-doped graphene layer, the p-doped graphene layer, the sub-transparent thin film photovoltaic cells, the operation of charging the touch panel by the transparent thin film photovoltaic cell, and the like may all refer to the relevant accompanying drawings and the relevant description in the first embodiment. No further redundant description will be given here.

It should be noted that the touch sensing electrodes 331 and the touch driving electrodes 332 in the touch panel provided by the embodiment are arranged in different layers. For instance, the plurality of touch sensing electrodes 331 may be extended along a first direction, and the plurality of touch driving electrodes 332 may be extended along a second direction. For instance, the first direction is perpendicular to the second direction. The plurality of touch sensing electrodes are insulated from each other, and the plurality of touch driving electrodes are insulated from each other.

In addition, the second substrate 320 in the touch panel provided by the embodiment is used not only as an opposing substrate of an LCD but also as a base substrate of the thin film photovoltaic cell. Thus, the materials can be saved, so that the production process can be reduced, and hence the cost can be saved.

Fourth Embodiment

Figure 9:
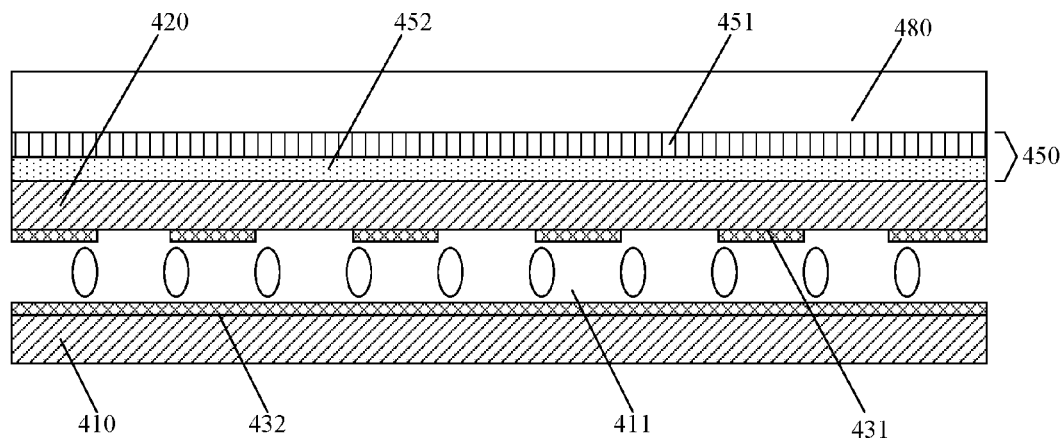
FIG. 9 is a schematic sectional partial view of another liquid crystal touch panel provided by an embodiment of the present disclosure.

The embodiment provides a touch panel, which is an in-cell touch panel. As illustrated in FIG. 9, the touch panel comprises a first substrate 410, a second substrate 420, and a liquid crystal layer 411 disposed between the first substrate 410 and the second substrate 420. The touch panel further comprises a plurality of touch driving electrodes 432 disposed on one side of the first substrate 410 facing the liquid crystal layer 411, a plurality of touch sensing electrodes 431 disposed on one side of the second substrate 420 facing the liquid crystal layer 411, a p-doped graphene layer 452 disposed on one side of the second substrate 420 away from the liquid crystal layer 411, and an n-doped graphene layer 451 disposed on the p-doped graphene layer 452. A transparent thin film photovoltaic cell includes the p-doped graphene layer and the n-doped graphene layer. The transparent thin film photovoltaic cell and a touch electrode layer (a touch sensing electrode layer) are respectively disposed on both sides of the second substrate.

It should be noted that: compared with the third embodiment, in the embodiment, only the position of the touch sensing electrodes is changed, and the touch sensing electrodes are disposed in a liquid crystal cell so as to form an in-cell touch panel. Among the others, for instance, the first area, the second area, the first lead, the second lead, the first electrode, the second electrode, the control circuit, the photosensitive unit, the driver IC, the n-doped graphene layer, the p-doped graphene layer, the sub-transparent thin film photovoltaic cells, and the case of charging the touch panel by the transparent thin film photovoltaic cell, are the same as those in the third embodiment.

The second substrate 420 in the touch panel provided by the embodiment is not only used as an opposing substrate of an LCD but also as a base substrate of the transparent thin film photovoltaic cell. In addition, a transparent thin film photovoltaic cell 450, formed by the p-doped graphene layer 452 and the n-doped graphene layer 451, and the touch sensing electrodes 431 are formed on both sides of the second substrate 420, so an additional transparent insulating layer is not required. Thus, the materials can be saved, so that the production process can be reduced, and hence the cost can be saved.

Fifth Embodiment

Figure 10:
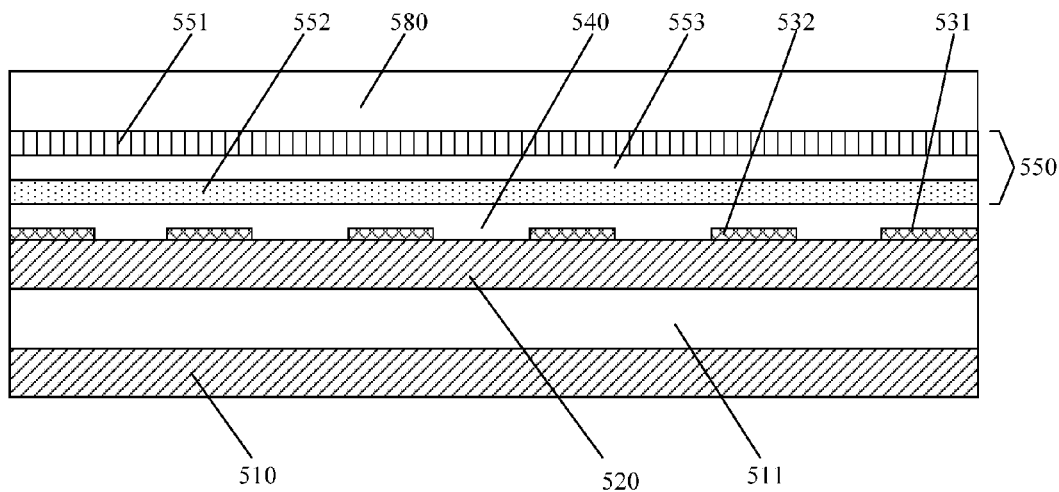
FIG. 10 is a schematic sectional partial view of an organic light-emitting diode (OLED) touch panel provided by an embodiment of the present disclosure.

The embodiment provides a touch panel. As illustrated in FIG. 10, the touch panel comprises a first substrate 510, a light emitting unit layer 511 disposed on the first substrate 510, a second substrate 520, a plurality of touch sensing electrodes 531 and a plurality of touch driving electrodes 532 disposed on one side of the second substrate 520 away from the light emitting unit layer 511, a transparent insulating layer 540 disposed on the plurality of touch sensing electrodes 531 and the plurality of touch driving electrodes 532, a p-doped graphene layer 552 disposed on the transparent insulating layer 540, a graphene layer 553 disposed on the p-doped graphene layer 552, and an n-doped graphene layer 551 disposed on the graphene layer 553.

For instance, the first substrate may be an array substrate, and the second substrate may be an organic light emitting diode (OLED) package cover or an OLED package film.

For instance, the material of the transparent insulating layer 540 may refer to the description on the transparent insulating layer in the first embodiment. No further redundant description will be given here.

For instance, the n-doped graphene layer 551 and the p-doped graphene layer 552 may be formed by way of the forming method in the first embodiment.

For instance, the graphene layer 553 may be formed by the method in the second embodiment.

In the embodiment, the graphene layer 553 is an i-type layer, and a transparent thin film photovoltaic cell 550 having a p-i-n structure may be formed by the n-doped graphene layer 551 and the p-doped graphene layer 552. When ambient light and/or light emitted by the light emitting unit layer 511 runs through the transparent thin film photovoltaic cell 550, the transparent thin film photovoltaic cell 550 can generate an electrical current for supplying power to and/or charging the touch panel.

It should be noted that the thin film photovoltaic cell in the embodiment may not include the i-type layer, and a transparent thin film photovoltaic cell having a p-n structure may be formed by the n-doped graphene layer 551 and the p-doped graphene layer 552.

For instance, the position of the transparent thin film photovoltaic cell 550 may be exchanged with the position of a touch electrode layer formed by the touch sensing electrodes 531 and the touch driving electrodes 532.

It should be noted that the structure and the layout of the touch electrode layer in the touch panel provided by the embodiment may be the same as or similar to those of the touch electrode layer in the second embodiment. The second substrate in the touch panel provided by the embodiment may include a first area and a second area; the n-doped graphene layer and the p-doped graphene layer of the transparent thin film photovoltaic cell may also be respectively connected with a control circuit or a driver IC through a first lead and a second lead; a first electrode and a second electrode may also be arranged; the control circuit may also include a photosensitive unit; and the transparent thin film photovoltaic cell may also include a plurality of sub-transparent thin film photovoltaic cells. It should be noted that the first lead, the second lead, the first electrode, the second electrode, the control circuit, the photosensitive unit, the n-doped graphene layer, the p-doped graphene layer, the touch sensing electrodes, the touch driving electrodes, the sub-transparent thin film photovoltaic cells, the operation of charging the touch panel by the transparent thin film photovoltaic cell, and the like may all refer to the relevant accompanying drawings and the relevant description in the first embodiment. No further redundant description will be given here.

The second substrate 520 in the embodiment not only has the function of a package substrate or a package film of the OLED touch panel but also is taken as a base substrate of the thin film photovoltaic cell. Thus, the materials can be saved, so that the production process can be reduced, and hence the cost can be saved.

Sixth Embodiment

Figure 11:
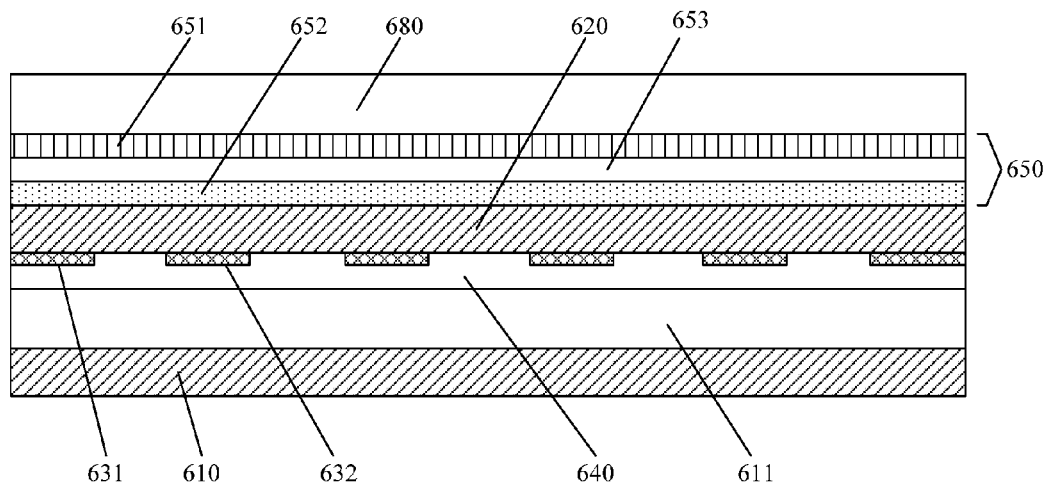
FIG. 11 is a schematic sectional partial view of another OLED touch panel provided by an embodiment of the present disclosure.

The embodiment provides a touch panel. As illustrated in FIG. 11, the touch panel comprises a first substrate 610, a second substrate 620, a light emitting unit layer 611 disposed on the first substrate 610, a plurality of touch sensing electrodes 631 and a plurality of touch driving electrodes 632 disposed on one side of the second substrate 620 facing the light emitting unit layer 611, a transparent insulating layer 640 disposed on one side of the plurality of touch sensing electrodes 631 and the plurality of touch driving electrodes 632 facing the light emitting unit layer 611, a p-doped graphene layer 652 disposed on a surface on one side of the second substrate 620 away from the light emitting unit layer 611, a graphene layer 653 disposed on the p-doped graphene layer 652, and an n-doped graphene layer 651 disposed on the graphene layer 653. A cover plate 680 may be disposed on the above structure.

For instance, the first substrate may be an array substrate; and the second substrate may be an OLED package cover or an OLED package film.

For instance, the material of the transparent insulating layer 640 may refer to the description on the transparent insulating layer in the first embodiment. No further redundant description will be given here.

For instance, the n-doped graphene layer 651 and the p-doped graphene layer 652 may be formed by way of the forming method in the first embodiment.

For instance, the graphene layer 653 may be formed by way of the method for forming the graphene layer in the second embodiment.

In the embodiment, a transparent thin film photovoltaic cell 650 having a p-i-n structure is formed by the p-doped graphene layer 652, the graphene layer 653 and the n-doped graphene layer 651. When ambient light and/or light emitted by the light emitting unit layer 611 runs through the transparent thin film photovoltaic cell 650, the transparent thin film photovoltaic cell 650 can generate an electrical current for supplying power to and/or charging the touch panel.

For instance, the position of the transparent thin film photovoltaic cell 650 may be exchanged with the position of a touch electrode layer formed by the touch sensing electrodes 631 and the touch driving electrodes 632.

It should be noted that: the second substrate in the touch panel provided by the embodiment of the present disclosure may include a first area and a second area; the n-doped graphene layer and the p-doped graphene layer of the transparent thin film photovoltaic cell may also be respectively connected with the a control circuit or a driver IC through a first lead and a second lead; a first electrode and a second electrode may also be arranged; the control circuit may also include a photosensitive unit; and the transparent thin film photovoltaic cell may also include a plurality of sub-transparent thin film photovoltaic cells. The first area, the second area, the first lead, the second lead, the first electrode, the second electrode, the control circuit, the photosensitive unit, the n-doped graphene layer, the p-doped graphene layer, the touch sensing electrodes, the touch driving electrodes, the sub-transparent thin film photovoltaic cells, the operation of charging the touch panel by the transparent thin film photovoltaic cell, and the like may all refer to the relevant accompanying drawings and the relevant description in the first embodiment. No further redundant description will be given here.

It should be noted that: when the second substrate 620 is a package substrate, the structure and the layout of the touch electrode layer in the touch panel provided by the embodiment are the same as or similar to those of the touch electrode layer in the first embodiment. The second substrate 620 in the embodiment is not only used as a package substrate of an OLED touch panel but also as a base substrate of the thin film photovoltaic cell and the touch electrode layer. Thus, the materials can be saved, so that the production process can be reduced, and hence the cost can be saved.

It should be noted that: the light emitting unit layer in the embodiment of the present disclosure may include a plurality of light emitting units; and each light emitting unit, for instance, includes an emission layer (EML), a cathode and an anode and may further includes a hole transport layer (HTL), an electron transport layer (ETL), a hole injection layer (HIL), an electron injection layer (EIL), etc.

The touch panel provided by the embodiment of the present disclosure employs a graphene thin film photovoltaic cell. When ambient light and/or light emitted by the touch panel runs through the graphene thin film photovoltaic cell, an electrical current can be generated to supply power for/charge the touch panel, so that the service time of the touch panel can be prolonged. Graphene is a kind of known nanomaterial which is the thinnest and hardest in the world, is almost completely transparent, and only absorbs 2.3% of light. When the graphene thin film photovoltaic cell made from graphene is formed on the touch panel, the thickness of the touch panel would not be greatly increased and the light transmission rate of the touch panel would not be excessively affected. Moreover, the graphene thin film photovoltaic cell may also have the function of protecting the touch panel and may be widely applied in various kinds of touch panels. In addition, by the reasonable configuration of the graphene thin film photovoltaic cell, an additional transparent insulating layer is not required. Thus, the materials can be saved, so that the production process can be reduced, and hence the cost can be saved. Moreover, the thickness can be lower. The touch panel has good market prospect under the market environment in pursuit of light and thin products.

It should be noted that the transparent thin film photovoltaic cell in the touch panel provided by all the embodiments of the present disclosure not only may adopt a graphene thin film photovoltaic cell having a p-n structure but also may adopt a graphene thin film photovoltaic cell having a p-i-n structure.

Seventh Embodiment

Figure 12:
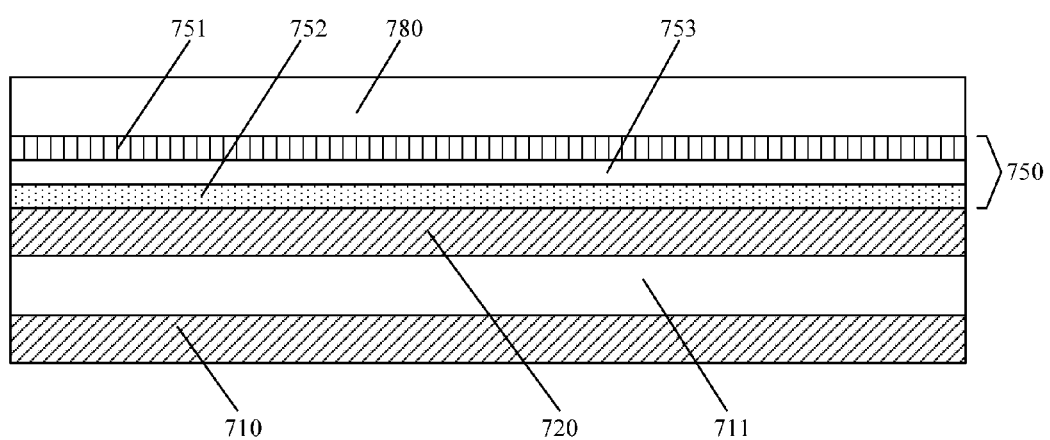
FIG. 12 is a schematic sectional partial view of another OLED display provided by an embodiment of the present disclosure.

The embodiment provides a display. As illustrated in FIG. 12, the display comprises a first substrate 710, a second substrate 720, a light emitting unit layer 711 disposed on the first substrate 710, a p-doped graphene layer 752 disposed on the second substrate, a graphene layer 753 disposed on the p-doped graphene layer 752, and an n-doped graphene layer 751 disposed on the graphene layer 753. A cover plate 780 may be disposed on the n-doped graphene layer 751.

For instance, the first substrate may be an array substrate, and the second substrate may be an OLED package cover or an OLED package film.

For instance, the n-doped graphene layer 751 and the p-doped graphene layer 752 may be formed by way of the forming method in the first embodiment.

For instance, the graphene layer 753 may be formed by way of the method for forming the graphene layer in the second embodiment.

For instance, a p-i-n type transparent thin film photovoltaic cell 750 is formed by the p-doped graphene layer 752, the graphene layer 753 and the n-doped graphene layer 751. When ambient light and/or light emitted by the light emitting unit layer 711 runs through the transparent thin film photovoltaic cell 750, the transparent thin film photovoltaic cell 750 can generate an electrical current for supplying power to and/or charging the display.

For instance, the p-i-n type transparent thin film photovoltaic cell 750 formed by the p-doped graphene layer 752, the graphene layer 753 and the n-doped graphene layer 751 may be formed on one side of the second substrate 720 facing the light emitting unit layer 711, and a transparent insulating layer is formed between the transparent thin film photovoltaic cell 750 and the light emitting unit layer 711.

For instance, the position of the p-doped graphene layer 753 and the position of the n-doped graphene layer 751 may be exchanged, and the p-i-n type transparent thin film photovoltaic cell 750 is formed by the p-doped graphene layer 753, the n-doped graphene layer 751, and the graphene layer 753 disposed between the p-doped graphene layer 753 and the n-doped graphene layer 751.

For instance, the graphene layer 753 may also be not arranged, and the transparent thin film photovoltaic cell only includes the p-doped graphene layer 753 and the n-doped graphene layer 751.

For instance, the second substrate at least includes a first area and a second area, and the second area is adjacent to and encircles the first area. For instance, the first area is a display area, and the second area is a peripheral area. The transparent thin film photovoltaic cell may be entirely disposed in the first area. For instance, the n-doped graphene layer and the p-doped graphene layer are respectively connected to a control circuit through a first lead and a second lead.

For instance, the transparent thin film photovoltaic cell may include a plurality of sub-transparent thin film photovoltaic cells. For instance, each sub-transparent thin film photovoltaic cell is strip-shaped. The plurality of sub-transparent thin film photovoltaic cells are disposed in the first area, and a gap is formed between adjacent sub-transparent thin film photovoltaic cells. The n-doped graphene layer and the p-doped graphene layer in each sub-transparent thin film photovoltaic cell may be respectively connected to a control circuit through a first lead and a second lead. For instance, the control circuit may also be replaced by a driver IC. That is to say, the n-doped graphene layer and the p-doped graphene layer in each sub-transparent thin film photovoltaic cell are respectively connected to the driver IC through the first lead and the second lead. For instance, the first lead and the n-doped graphene layer are arranged in the same layer, and the second lead and the p-doped graphene layer are arranged in the same layer. The first lead and the second lead are mutually staggered. For instance, when light of enough light intensity is irradiated to the transparent thin film photovoltaic cell, the electrical current generated by each sub-transparent thin film photovoltaic cell may be directly connected to the driver IC for supplying power through the first lead and the second lead. Thus, the service time of the display can be prolonged.

It should be noted that the shape of the sub-transparent thin film photovoltaic cell is not limited to the shape of strip and may also be other shapes in addition to the shape of strip, e.g., the shape of comb, wavy, triangular, and trapezoidal. When a part of transparent thin film photovoltaic cell is disposed in the display area, the coverage range and the proportion of the transparent thin film photovoltaic cell may be adjusted according to actually required aperture ratio. For instance, when a high aperture ratio is required, a large gap may be disposed between the sub-transparent thin film photovoltaic cells. In the case of an enough aperture ratio, a small gap may be formed between the sub-transparent thin film photovoltaic cells.

For instance, the display further comprises a first electrode and a second electrode. The n-doped graphene layer of the transparent thin film photovoltaic cell is connected with the control circuit through the first electrode. The p-doped graphene layer of the transparent thin film photovoltaic cell is connected with the control circuit through the second electrode. For instance, the first electrode and the second electrode may be arranged in the same layer and spaced from each other.

For instance, the display may further comprise a rechargeable battery. The control circuit is configured to control the transparent thin film photovoltaic cell to charge the rechargeable battery or not.

For instance, the control circuit may further include a photosensitive unit which is configured to detect the light intensity, so as to control whether to charge the rechargeable battery.

For instance, the embodiment provides a control flow of the display. The control flow may be as follows: in the case of light illumination with enough intensity, the transparent thin film photovoltaic cell generates an electrical current; the control circuit detects whether the display is operating; if the display is operating, the control circuit controls the transparent thin film photovoltaic cell to not charge the rechargeable battery; if the display does not operate, the control circuit continuously detects whether the rechargeable cell is fully charged; and if the rechargeable cell is not fully charged, the control circuit controls the transparent thin film photovoltaic cell to charge the rechargeable battery. By adoption of the above control flow, in the display provided by the embodiment of the present disclosure, in the case of enough light illumination, when the display does not operate, the rechargeable battery may be charged and the electric energy is stored. Thus, the service time of the display can be greatly prolonged and the charging frequency can be reduced.

It should be noted that the control flow of the display provided by the embodiment of the present disclosure is not limited thereto. For instance, when the display operates, the rechargeable battery may also be charged. Thus, the effect of long duration can be achieved, and even the effect of charging the rechargeable battery only by the thin film photovoltaic battery without the external power source can be achieved. If the transparent thin film photovoltaic cell can generate enough electrical power, the electrical current can also directly enter the control circuit, so as to control the operation of the display.

Eighth Embodiment

Figure 13:
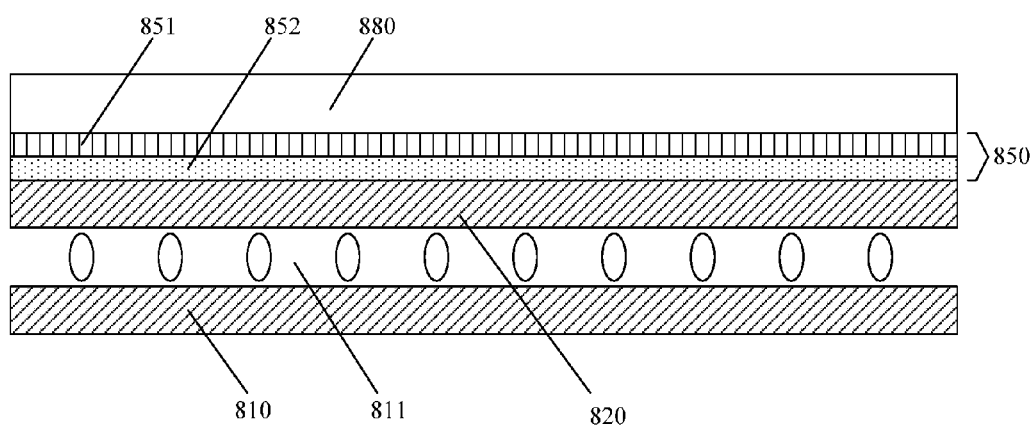
FIG. 13 is a schematic sectional partial view of another liquid crystal display (LCD) provided by an embodiment of the present disclosure.

The embodiment provides a display. As illustrated in FIG. 13, the display comprises a first substrate 810, a second substrate 820, a liquid crystal display 811 disposed between the first substrate 810 and the second substrate 820, a p-doped graphene layer 852 disposed on a surface on one side of the second substrate 820 away from the liquid crystal layer 811, and an n-doped graphene layer 851 disposed on the p-doped graphene layer 852. A cover plate 880 may be disposed on the n-doped graphene layer 851.

For instance, the first substrate may be an array substrate, and the second substrate may be an opposing substrate.

For instance, the n-doped graphene layer 851 and the p-doped graphene layer 852 may be formed by way of the forming method in the first embodiment.

For instance, a transparent thin film photovoltaic cell 850 having a p-n structure is formed by the p-doped graphene layer 852 and the n-doped graphene layer 851. When ambient light and/or back light passing through the second substrate 820 runs through the transparent thin film photovoltaic cell 850, the transparent thin film photovoltaic cell 850 can generate an electrical current for supplying power to and/or charging the display.

For instance, the pn-type transparent thin film photovoltaic cell 850 formed by the p-doped graphene layer 852 and the n-doped graphene layer 851 may be formed on a surface on one side of the second substrate 820 facing the liquid crystal layer 811.

For instance, the position of the p-doped graphene layer 852 and the position of the n-doped graphene layer 851 may be exchanged.

It should be noted that the second substrate in the display provided by the embodiment of the present disclosure may include a first area and a second area; the n-doped graphene layer and the p-doped graphene layer of the transparent thin film photovoltaic cell may also be respectively connected with a control circuit or a driver IC through a first lead and a second lead; a first electrode and a second electrode may also be arranged; the control circuit may also include a photosensitive unit; and the transparent thin film photovoltaic cell may also include a plurality of sub-transparent thin film photovoltaic cells. The first area, the second area, the first lead, the second lead, the first electrode, the second electrode, the control circuit, the photosensitive unit, the driver IC, the n-doped graphene layer, the p-doped graphene layer, the sub-transparent thin film photovoltaic cells, the case of charging the display by the transparent thin film photovoltaic cell, and the like may all refer to the relevant description in the seventh embodiment. No further redundant description will be given here.

The display provided by the embodiment of the present disclosure employs a graphene transparent thin film photovoltaic cell. When ambient light and/or light emitted by the display runs through the graphene transparent thin film photovoltaic cell, an electrical current can be generated to supply power or charge for the display, so that the service time of the display can be prolonged. Graphene is a kind of known nanomaterial which is the thinnest and hardest in the world, is almost completely transparent, and only absorbs 2.3% of light. When the graphene thin film photovoltaic cell made from graphene is formed on the display, the thickness of the display would not be greatly increased and the light transmission rate of the display would not be excessively affected. Moreover, the graphene thin film photovoltaic cell may also have the function of protecting the display and may be widely applied in various kinds of touch panels, displays and touch display panels.

Ninth Embodiment

The embodiment provides a touch display device, which comprises the touch panel provided by any one of embodiments 1 to 6, or any display provided by the seventh embodiment or the eighth embodiment. Obviously, the touch display device provided by the embodiment may further comprise other structures. No further redundant description will be given here.

The touch display device provided by at least one embodiment of the present disclosure employs a graphene thin film photovoltaic cell which is integrated into a touch panel. When ambient light and/or light emitted by a display module runs through the graphene thin film photovoltaic cell, an electrical current can be generated to supply power for/charge the touch panel/display/touch display device, so that the service time of the touch panel/display/touch display device can be prolonged. Graphene is a kind of known nanomaterial which is the thinnest and hardest in the world, is almost completely transparent, and only absorbs 2.3% of light. When the graphene thin film photovoltaic cell made from graphene is formed on the touch panel/display/touch display device, the thickness of the touch panel/display/touch display device would not be greatly increased and the light transmission rate of the touch panel would not be excessively affected. Moreover, the graphene thin film photovoltaic cell may also have the function of protecting the touch panel. In addition, by the reasonable configuration of the graphene thin film photovoltaic cell, an additional transparent insulating layer is not required. Thus, the materials can be saved, so that the production process can be reduced, and hence the cost can be saved. Moreover, the thickness can be lower. The touch display device has good market prospect under the market environment in pursuit of light and thin products.

It should be noted that: (1) in the embodiments of the present disclosure, unless otherwise specified, the technical terms or scientific terms used herein have normal meanings understood by those skilled in the art. The words "first", "second" and the like used in the present disclosure do not indicate the sequence, the number or the importance but are only used for distinguishing different components. Similarly, the words "a", "an", "the" and the like also do not indicate the number but only indicate at least one. The word "comprise", "include" or the like only indicates that an element or a component before the word contains elements or components listed after the word and equivalents thereof, not excluding other elements or components. The words "on", "beneath", "left", "right" and the like only indicate the relative position relationship which may also be correspondingly changed when the absolute position of a described object is changed. (2) In the accompanying drawings of the embodiments of the present disclosure, the thickness of the layer or the area may be enlarged. It should be understood that when an element such as a layer, a film, an area or a substrate is referred to be disposed "on" another element, the element may be "directly" disposed "on" another element, or an intermediate element may be provided. (3) In the description of the embodiments, the specific features, the structures, the materials or the characteristics may be combined by appropriate ways in any one or more embodiments or examples. (4) The position of the n-doped graphene layer and the p-doped graphene layer in the embodiments of the present disclosure may be exchanged. (5) The transparent thin film photovoltaic cell in the touch panel/display/touch display panel provided by the embodiments of the present disclosure may adopt the transparent thin film photovoltaic cell having the p-n structure and may also adopt the transparent thin film photovoltaic cell having the p-i-n structure. (6) In the embodiments of the present disclosure, the opposing substrate and the array substrate are arranged opposite to each other and are respectively an upper substrate and a lower substrate of a display panel; display structures such as a thin-film transistor (TFT) array and pixel electrodes are generally formed on the array substrate; and color filter resin is formed on the opposing substrate. For instance, the opposing substrate is a CF substrate. (7) In the embodiments of the present disclosure, when a light emitting unit layer is included, the light emitting unit layer may include a plurality of light emitting units. Each light emitting unit, for instance, may include an EML, a cathode and an anode and may also include an HTL, an ETL, an HIL, an EIL, etc. (8) The embodiments and the accompanying drawings of the present disclosure only illustrate or show the relevant parts of the application, and the remaining parts which are not described refer to common designs. (9) It should be noted that the first lead in the accompanying drawings is represented by a solid line and the second lead is represented by a dotted line for distinguishing. (10) The touch display panel provided by the embodiments of the present disclosure may be applied in: any product or component with touch and display functions such as an LCD panel, e-paper, an LCD TV, an LCD, a digital picture frame, a mobile phone, a watch and a tablet PC. (11) Description is given in the embodiments and the accompanying drawings of the present disclosure by taking a mutual-capacitance touch electrode structure as an example. The touch electrode structure in the touch electrode layer may adopt a general structure and is not limited to those described in the present disclosure. Description is given in the embodiments of the present disclosure by taking a mutual-capacitance touch panel as an example. The touch electrode layer of the mutual-capacitance touch panel includes transverse electrodes and/or longitudinal electrodes. In general, the transverse electrodes and the longitudinal electrodes are arranged in different layers. An insulating layer may be disposed between a layer provided with the transverse electrodes and a layer provided with the longitudinal electrodes. Capacitance can be produced at intersections of two groups of electrodes. When a finger touches the mutual-capacitance touch panel, the coupling of two electrodes close to a touch point is affected, so that the capacitance between the two electrodes can be changed. A touch position is determined by the detection of the variation of the capacitance (for instance, the variation of the capacitance may be detected by a touch detection chip). But not limited to the mutual-capacitance touch electrode structure, a self-capacitive touch electrode structure may also be adopted. For instance, the touch electrode layer includes a touch electrode array. Touch electrodes are mutually insulated and respectively combined with the ground to form capacitors. When a finger touches a self-capacitive touch panel, the capacitance of the finger will be added to corresponding touch electrode, and a touch position may be determined by the detection of the capacitance variation of the touch electrodes (for instance, the capacitance variation may be detected by a touch detection chip). No limitation will be given in the present disclosure.

The foregoing is only the preferred embodiments of the present disclosure and not intended to limit the scope of protection of the present disclosure. Any change or replacement that may be easily thought of by those skilled in the art within the technical scope disclosed by the present disclosure shall fall within the scope of protection of the present disclosure. Therefore, the scope of protection of the present disclosure shall be defined by the appended claims.

The application claims priority to the Chinese patent application No. 201510319716.2, filed Jun. 10, 2015, the disclosure of which is incorporated herein by reference as part of the application.

What is claimed is:

1. A touch panel, comprising a base substrate, a touch electrode layer and a transparent thin film photovoltaic cell that are disposed on the base substrate, a control circuit, a first electrode and a second electrode, wherein the touch electrode layer and the transparent thin film photovoltaic cell are mutually superimposed and disposed on a same side of the base substrate, and a transparent insulating layer is disposed between the touch electrode layer and the transparent thin film photovoltaic cell, or the touch electrode layer and the transparent thin film photovoltaic cell are respectively disposed on either side of the base substrate; the transparent thin film photovoltaic cell includes an n-doped graphene layer and a p-doped graphene layer; and the n-doped graphene layer and the p-doped graphene layer are respectively connected to the control circuit through the first electrode and the second electrode.

2. The touch panel according to claim 1, wherein the transparent thin film photovoltaic cell further includes a graphene layer which is disposed between the n-doped graphene layer and the p-doped graphene layer.

3. A touch panel comprising a base substrate, a touch electrode layer and a transparent thin film photovoltaic cell that are disposed on the base substrate, a control circuit, a first lead and a second lead, wherein the touch electrode layer and the transparent thin film photovoltaic cell are mutually superimposed and disposed on a same side of the base substrate, and a transparent insulating layer is disposed between the touch electrode layer and the transparent thin film photovoltaic cell, or the touch electrode layer and the transparent thin film photovoltaic cell are respectively disposed on either side of the base substrate;

the transparent thin film photovoltaic cell includes an n-doped graphene layer and a p-doped graphene layer; the n-doped graphene layer and the p-doped graphene layer are respectively connected to the control circuit through the first lead and the second lead; the first lead and the n-doped graphene layer are arranged in a same layer; the second lead and the p-doped graphene layer are arranged in a same layer; and the first lead and the second lead are mutually staggered.

4. The touch panel according to claim 1, wherein the first electrode and the second electrode are arranged in a same layer and spaced from each other.

5. The touch panel according to claim 3, further comprising a rechargeable battery, wherein the control circuit is configured to control the transparent thin film photovoltaic cell to charge the rechargeable battery or not.

6. The touch panel according to claim 5, wherein the control circuit includes a photosensitive unit which is configured to detect light intensity, so as to control whether to charge the rechargeable battery.

7. The touch panel according to claim 1, wherein the touch electrode layer includes a plurality of touch driving electrodes and/or a plurality of touch sensing electrodes.

8. The touch panel according to claim 1, wherein the transparent insulating layer includes any one selected from the group consisting of a transparent optical clear adhesive layer, a SiNxOy layer, a $SiO_2$ layer and an alumina layer.

9. The touch panel according to claim 1, wherein in a case the touch electrode layer and the transparent thin film photovoltaic cell are disposed on the same side of the base substrate, the transparent thin film photovoltaic cell is disposed between the base substrate and the touch electrode layer, or the touch electrode layer is disposed between the base substrate and the transparent thin film photovoltaic cell.

10. The touch panel according to claim 1, wherein the base substrate at least includes a first area and a second area; the second area is adjacent to and encircles the first area; the first area is a touch area, and the second area is a peripheral area; the transparent thin film photovoltaic cell is entirely disposed in the first area; or a part of the transparent thin film photovoltaic cell is disposed in the first area.

11. The touch panel according to claim 10, wherein in a case a part of the transparent thin film photovoltaic cell is disposed in the first area, the transparent thin film photovoltaic cell includes a plurality of sub-transparent thin film photovoltaic cells.

12. A touch display device, comprising the touch panel according to claim 1.

13. The touch panel according to claim 1, further comprising a rechargeable battery, wherein the control circuit is configured to control the transparent thin film photovoltaic cell to charge the rechargeable battery or not.

14. The touch panel according to claim 2, wherein the touch electrode layer includes a plurality of touch driving electrodes and/or a plurality of touch sensing electrodes.

15. The touch panel according to claim 2, wherein in a case the touch electrode layer and the transparent thin film photovoltaic cell are disposed on the same side of the base substrate, the transparent thin film photovoltaic cell is disposed between the base substrate and the touch electrode layer, or the touch electrode layer is disposed between the base substrate and the transparent thin film photovoltaic cell.

16. The touch panel according to claim 2, wherein the base substrate at least includes a first area and a second area; the second area is adjacent to and encircles the first area; the first area is a touch area, and the second area is a peripheral area; the transparent thin film photovoltaic cell is entirely disposed in the first area; or a part of the transparent thin film photovoltaic cell is disposed in the first area.

17. The touch panel according to claim 16, wherein in a case a part of the transparent thin film photovoltaic cell is disposed in the first area, the transparent thin film photovoltaic cell includes a plurality of sub-transparent thin film photovoltaic cells.

\* \* \* \* \*